(12) United States Patent
Hater et al.

(10) Patent No.: US 10,287,199 B2
(45) Date of Patent: May 14, 2019

(54) USE OF PHOSPHOTARTARIC ACID AND THE SALTS THEREOF FOR THE TREATMENT OF WATER IN WATER-CONDUCTING SYSTEMS

(71) Applicant: KURITA WATER INDUSTRIES LTD., Tokyo (JP)

(72) Inventors: Wolfgang Hater, Kaarst (DE); Rudolf Lunkenheimer, Wackernheim (DE); Florian Wolf, Heppenheim (DE)

(73) Assignee: KURITA WATER INDUSTRIES LTD., Tokyo (JP)

(*) Notice: Subject to any disclaimer, the term of this patent is extended or adjusted under 35 U.S.C. 154(b) by 164 days.

(21) Appl. No.: 15/110,264

(22) PCT Filed: Dec. 2, 2014

(86) PCT No.: PCT/EP2014/003210
§ 371 (c)(1),
(2) Date: Jul. 7, 2016

(87) PCT Pub. No.: WO2015/120871
PCT Pub. Date: Aug. 20, 2015

(65) Prior Publication Data
US 2016/0326037 A1   Nov. 10, 2016

(30) Foreign Application Priority Data
Feb. 12, 2014   (DE) .......... 10 2014 001 931

(51) Int. Cl.
| | | |
|---|---|---|
| C02F 5/00 | (2006.01) | |
| C02F 5/14 | (2006.01) | |
| C23F 11/08 | (2006.01) | |
| C23F 11/10 | (2006.01) | |
| C23F 11/12 | (2006.01) | |
| C23F 11/167 | (2006.01) | |
| C23F 11/18 | (2006.01) | |
| C02F 1/50 | (2006.01) | |

(Continued)

(52) U.S. Cl.
CPC ............. *C02F 5/145* (2013.01); *C02F 1/50* (2013.01); *C02F 1/72* (2013.01); *C02F 5/125* (2013.01); *C09K 15/06* (2013.01); *C23F 11/08* (2013.01); *C23F 11/10* (2013.01); *C23F 11/126* (2013.01); *C23F 11/1673* (2013.01); *C23F 11/184* (2013.01); *C02F 5/14* (2013.01); *C02F 2103/023* (2013.01); *C02F 2209/29* (2013.01); *C02F 2303/04* (2013.01); *C02F 2303/08* (2013.01)

(58) Field of Classification Search
CPC ...................................... C02F 5/145
See application file for complete search history.

(56) References Cited

U.S. PATENT DOCUMENTS 4,120,655 A   10/1978   Crambes et al.

FOREIGN PATENT DOCUMENTS

| EP | 0 369 584 A1 | 5/1990 |
|---|---|---|
| GB | 2 112 370 A | 7/1983 |

OTHER PUBLICATIONS

Lynen, F. et al., "Phosphor-d(+)-weinsäure," Chemische Berichte, Oct. 14, 1952, p. 905-912, vol. 85, No. 9-10.

(Continued)

*Primary Examiner* — Peter Keyworth
(74) *Attorney, Agent, or Firm* — Manabu Kanesaka (57) ABSTRACT

The present invention relates to the use of phospho-tartaric acid and/or the salts thereof for the treatment of water in water-conducting systems.

20 Claims, 2 Drawing Sheets

(51) Int. Cl.
    *C02F 1/72*     (2006.01)
    *C02F 5/12*     (2006.01)
    *C09K 15/06*     (2006.01)
    *C02F 103/02*     (2006.01)

(56) References Cited

OTHER PUBLICATIONS

PCT/ISA/210, "International Search Report for International Application No. PCT/EP2014/003210, dated Feb. 19, 2015".

USE OF PHOSPHOTARTARIC ACID AND THE SALTS THEREOF FOR THE TREATMENT OF WATER IN WATER-CONDUCTING SYSTEMS

RELATED APPLICATIONS

The present application is National Phase of International Application No. PCT/EP2014/003210 filed Dec. 2, 2014, and claims priority from German Application No. 10 2014 001 931.4, filed Feb. 12, 2014, the disclosure of which is hereby incorporated by reference herein in its entirety.

BACKGROUND OF THE INVENTION

The present invention relates to the use of phosphotartaric acid and the salts thereof for the treatment of water in water-conducting systems.

PRIOR ART

The use of additives for treating water in water-conducting systems is known from the prior art. Examples of water-conducting systems are heat exchangers, air-conditioning systems, cooling systems, cooling tower systems, evaporation plants, heating systems, water processing systems, waste water systems and membrane systems. Water-conducting systems often have problems with corrosion of components or system parts and the formation of scale on surfaces of components and system parts. The causes of these problems originate largely from the composition, the constituents or the elements of the water. Accordingly, additives are used in water-conducting systems for inhibiting corrosion and scale formation. The treatment of water in water-conducting systems is known in the prior art, particularly the treatment of cooling water, and is described in the literature, for example, in Colin Frayne: Cooling Water Treatment, Chemical Publishing Co., New York 1999; Marie J. Alton: Chemical Treatment for cooling water, The Fairmont Press, Lilburn 1998; H.-D. Held, H., G. Schnell (editor): Kühlwasser [Cooling water], Vulkan-Verlag, Essen 1994; G. Schmitt (ed.): Korrosion in Kühlkreisläufen [Corrosion in cooling circuits], Verlag Irene Kuron, Bonn 1990; H., G. Schnell, W.-D. Schnell: Kühlwasser [Cooling water], Vulkan-Verlag, Essen 2012.

In the prior art for example, oxygen binders are used for inhibiting corrosion, for example hydrazine, which binds oxygen present in the water or wet steam and thus inhibits the corrosion of metal surfaces, for example in metal pipelines. The toxicity of hydrazine is a particular disadvantage here. Further examples of corrosion inhibitors are phosphates, phosphonates and heavy metals, such as zinc, molybdates, tungstates and chromates. A disadvantage of further corrosion inhibitors known from the prior art is their mostly selective effect, i.e. the known corrosion inhibitors selectively show a good effect on corrosion only for one metal or type of alloy. Certain corrosion inhibitors, for example, act either on ferritic steels and alloys or on non-ferrous metals.

Another problem in water-conducting systems is scaling, scale-up and/or fouling. This is understood to mean undesired deposition, scale formation and/or encrustation on surfaces of water-conducting systems, particularly on interfaces with heat transfer coefficients, such as on metallic surfaces. These deposits and scales impair the function of water-conducting systems. In this case, this can lead in particular to the reduction of throughput in water-conducting systems caused by (in part) obstruction of pipelines, reduced heat/cooling transfer, local overheating of system parts and increased production stoppages due to required cleaning downtime.

In the prior art, for example, water-conducting systems are predominantly operated in circuits due to cost, processing and/or energy considerations, which frequently leads to an accumulation of scale-forming elements, such as poorly-soluble salts, such as alkaline earth metal carbonates, hydrogen carbonates, sulfates or phosphates, such as magnesium carbonate, magnesium hydrogen carbonate, calcium carbonate, calcium hydrogen carbonate, magnesium phosphate, manganese salts leading to deposition of manganese dioxide or Mn(III/IV) oxide/hydrides or carbonates, silicates and also diverse hydroxides such as aluminum hydroxide, iron hydroxide, manganese hydroxide and magnesium hydroxide, if no discharge of elements from the water-conducting system and/or regulation of the solubility equilibrium conditions in the water-conducting system takes place. In addition, the concentration of these elements can also occur in water-conducting systems by evaporation processes, particularly at high process temperatures. If salt concentrations, for example, rise above the saturation point, this can lead to precipitation of salt crystals, which may in turn form undesirable deposits. Moreover, the sedimentation of undissolved solids, which are introduced into the water-conducting system by the water, can lead to the formation of scale in the water-conducting system.

A further example of fouling can be a settling out of bacterial plaques and/or algae which is also referred to as biological fouling. Both the elements which can cause encrustations and deposits and corrosion-triggering/corrosion-enhancing elements act as limiting factors for accumulation in water-conducting systems.

Scale formation and corrosion in water-conducting systems is influenced by numerous parameters such as the oxygen concentration, electrolyte content, pH, temperature, flow rate of the medium, etc., in water-conducting systems.

In this context, the carbonate hardness (deposit-forming) present in water-conducting systems and the chloride content (causing/enhancing corrosion processes) present in water-conducting systems should be mentioned. The concentrations of, for example, magnesium and calcium ions are also often determined separately and then referred to as magnesium hardness or calcium hardness respectively. Chemical water treatment methods for controlling carbonate and chloride content are known to those skilled in the art. For example, carbonate and chloride contents can be reduced by means of ion exchangers. The formation of poorly-soluble precipitates of carbonate ions and polyvalent cations, such as magnesium or calcium ions, can also be suppressed by deposit-inhibiting compounds. In general, chemical fouling or scale inhibitors can reduce undesirable deposits in water-conducting systems, for example by disrupting the crystallization or else disrupting the deposition or consolidation stages of fouling processes.

Examples of scale inhibitors in water-conducting systems are chelating agents, such as EDTA, long-chain aliphatic amines, for example octadecylamine or polyamines such as oleyldipropylenetriamine and other film-forming amines, organic phosphonic acids such as HEDP (1-hydroxyethane-(1,1-diphosphonic acid)) or polyelectrolytes such as polyacrylic acid, polymethacrylic acid or copolymers of acrylic acid and maleic acid having low molecular weights. Once carbonate and chloride contents in water-conducting systems are under control, other ingredients of the water often come into focus for chemical treatment of water-conducting systems, which can only be insufficiently controlled by the known compounds. Sulfates, phosphates, fluorides, oxalates and above all silicates may also be the cause of problems, depending on the technical design of the water-conducting systems.

A disadvantage of the uses of corrosion inhibitors and scale inhibitors known from the prior art is that these additives can be used largely successfully either only for corrosion inhibition or only for scale inhibition in water-conducting systems. One exception here is the use of phosphates and phosphonates, which, although acting as corrosion inhibitors and for preventing scale, have other disadvantages stated below. Phosphates, oligophosphates and polyphosphates form calcium phosphate deposits after hydrolysis in hard water and many phosphonates are only poorly biologically degradable.

There was, therefore, an urgent requirement to provide additives for the inhibition of corrosion and scale in water-conducting systems which are both corrosion-inhibiting and effectively inhibit or reduce the formation of deposits. The inhibition of corrosion should also be non-selective, i.e. not be limited to certain types of metal. In addition, the additives should be readily biologically degradable.

The object of the present invention, therefore, is to provide additives for the treatment of water in water-conducting systems which do not have the disadvantages mentioned above, and which at the same time have at least one satisfactory corrosion-inhibiting and one satisfactory scale-inhibiting effect. In addition, it should also be possible to use these additives for the treatment of water having high chloride contents.

In addition, the corrosion-inhibiting effect of the additives for the treatment of water in water-conducting systems should not be limited to selected metal compounds. In particular, these additives should have improved biological degradability and, in addition, may be combined with other scale and/or corrosion inhibitors and/or biodispersants and/or dispersants and/or biocides.

Moreover, the additives according to the invention should be processable and stable over a long time period and, in particular, have improved chlorine stability.

SUMMARY OF THE INVENTION

It has now been found, surprisingly, that this object is achieved by phosphotartaric acid and/or salts thereof. Of advantage is the combined effect of corrosion inhibition with scale inhibition. Moreover, the corrosion-inhibiting effect of using phosphotartaric acid and/or salts thereof according to the invention is not predominantly selective and is therefore not limited to selected metal compounds and shows good biological degradability. Furthermore, the use of phosphotartaric acid and/or salts thereof according to the invention, in combination with other constituents, such as, for example, selected from aliphatic di-, tri- and oligocarboxylic acids comprising up to 6 carboxylic acid groups, aliphatic monocarboxylic acids having at least one hydroxyl group, amino acids, salts thereof and mixtures thereof, inorganic polyphosphoric acid, meta-polyphosphoric acid and water-soluble organic phosphonates and salts thereof, show a synergistic effect, particularly in the case of corrosion inhibition.

The invention therefore relates to the use of phosphotartaric acid and/or salts thereof for the treatment of water in water-conducting systems.

The invention further relates to a composition comprising phosphotartaric acid and/or salts thereof and is one or more hydroxycarboxylic acid(s) and/or salts thereof.

DETAILED DESCRIPTION OF THE INVENTION

In the context of the present invention, water-conducting systems are understood to mean technical systems in which the medium conducted is predominantly water. Examples of water-conducting systems are heat exchangers, air-conditioning systems, cooling systems, cooling tower systems, evaporation plants, heating systems, water processing systems, waste water systems and membrane systems. Metals used in the water-conducting systems are, for example, unalloyed or low-alloy steel, stainless steel, copper and copper alloys, aluminum and aluminum alloys, galvanized steel and combinations thereof.

In the context of the present invention, treatment of water is understood to mean the influence on parameters in and/or of water-conducting systems. Examples of these parameters are pH, temperature, conductivity, dissolved gas content, free gas content, water hardness, ion concentrations, fraction of hardness-forming constituents, and also the composition of the water, its constituents, gases, crystallization forms, deposits, fouling, etc. It may also include water, for example, in cooling water systems which are fed from surfaces, ground water, brackish water or seawater, which may be pretreated, for example, by filtration, softening or desalination with or without back-mixing. The pH is typically in the range of 6 to 10, the conductivity can be between a few μS/cm in the case of desalinated water and up to 200 000 μS/cm in the case of seawater. The calcium hardness is generally from 0 mg/L up to 3000 mg/L. The water temperatures are generally between 10° C. and 50° C. and, in the case of hot water systems, up to 150° C.

The use of phosphotartaric acid and/or salts thereof according to the invention for the treatment of water in water-conducting systems has the following advantages:
- a combined effect of corrosion inhibition with scale inhibition,
- effect not limited only to selected metal compounds,
- good biological degradability,
- good combination possibilities with other additives, for example with dispersants, in particular biodispersants, biocides, corrosion inhibitors, scale inhibitors,
- synergistic effects, particularly in the case of corrosion inhibition when combining application of the use according to the invention with other constituents, for example further corrosion inhibitors. For example, this applies to the interaction of chemicals with synergetic or synergistic effects, when the combined effects are potentiated,
- possibility to adjust an aqueous solution and/or dispersion of phosphotartaric acid and/or salts thereof in a wide pH range from acidic to alkaline,
- good stability with respect to oxidizing biocides, such as sodium hypochlorite, in water-conducting systems,
- simple monitoring using known analysis methods.

In accordance with a preferred embodiment, phosphotartaric acid is added to water-conducting systems in an amount of 0.1 to 10 000 mg, preferably 0.2 to 1000 mg, particularly preferably 0.3 to 300 mg, based on one liter of the water-conducting system.

In accordance with a preferred embodiment, the water in the water-conducting system has a conductivity in the range of 1 to 200 000 μS/cm, preferably in the range of 5 to 2000 μS/cm, particularly preferably in the range of 10 to 5000 μS/cm.

In accordance with a preferred embodiment, the phosphotartaric acid and/or the salts thereof is used in water-conducting systems having a calcium hardness in the range of 0 to 30 mol, preferably in the range of 0.1 to 20 mol, particularly preferably in the range of 0.5 to 15 mol, based on one cubic meter of liquid of the water-conducting system.

In the context of the present invention, calcium hardness is understood to mean the concentrations of calcium ions in water-conducting systems, based on one cubic meter of liquid of the water-conducting system, measured according to DIN 38406-3, version 03, 2002. In accordance with a preferred embodiment, the phosphotartaric acid and/or salts thereof are used in the form of one or more alkali metal salts and/or one or more ammonium salts.

In accordance with a preferred embodiment, the phosphotartaric acid and/or salts thereof are used as scale inhibitor. In the context of the present invention, scale inhibitor is understood to mean an inhibitor which is added to the water-conducting system, for example a water circuit, such that the undesired reaction of corrosion is prevented.

In accordance with a preferred embodiment, the phosphotartaric acid and/or salts thereof are used as scale inhibitor. In the context of the present invention, scale inhibitor is understood to mean an inhibitor which is added to the water-conducting system, for example a water circuit, such that the undesired reactions of scaling, scale-up and/or fouling are prevented, i.e. undesired accumulation, deposits, scale formation and/or encrustation on surfaces of components of water-conducting systems, particularly on interfaces with heat exchange coefficients such as metallic surfaces in water-conducting systems, which impair the function of the water-conducting system. Further examples of the impairment of the function of water-conducting systems is the reduction of throughput in water-conducting systems due to (partial) blockage of pipelines, reduced heat/cooling transfer, local overheating of system components and increased production downtime to perform required cleaning. In the context of the present invention, inhibitors are understood to mean inhibitors which influence one or more reactions of a chemical, biological or physical nature such that said reactions are retarded, inhibited or prevented. Examples of these reactions are corrosion, scaling, scale-up or fouling.

In accordance with a preferred embodiment, the phosphotartaric acid and/or the salts thereof is used as constituent a) together with at least one further constituent b) and/or c), wherein constituent b) is selected from aliphatic di-, tri- and oligocarboxylic acids comprising up to 6 carboxylic acid groups, aliphatic monocarboxylic acids having at least one hydroxyl group, amino acids, salts thereof and mixtures thereof, and constituent c) is selected from inorganic polyphosphoric acid, meta-polyphosphoric acid and salts thereof and water-soluble organic phosphonic acids and salts thereof and mixtures thereof.

In the context of the present invention, b1) is understood to mean aliphatic di-, tri- and oligocarboxylic acids comprising up to 6 carboxylic acid groups, particularly those having at least one hydroxyl group, in particular tartaric acid, malic acid, gluconic acid, citric acid, isocitric acid, tartronic acid, alkanedioic acids having the formula $COOH-(CH_2)_n-COOH$, wherein n is in the range from 1 to 14, particularly oxalic acid, malonic acid, succinic acid, fumaric acid, maleic acid, butanetetracarboxylic acid, cyclohexanehexanecarboxylic acid, salts thereof and combinations thereof.

In the context of the present invention, b2) is understood to mean aliphatic monocarboxylic acids having at least one hydroxyl group, in particular lactic acid, glycolic acid, mandelic acid, gallic acid, salicylic acid, hydroxybenzoic acid, mevalonic acid, salts thereof and combinations thereof.

In the context of the present invention, b3) is understood to mean amino acids and salts thereof, in particular ethylenediaminetetraacetic acid, iminodisuccinic acid, alanine, glycine, isoleucine, leucine, methionine, proline, valine, asparagine, glutamine, serine, threonine, tyrosine, lysine, arginine, histidine, aspartic acid, glutamic acid, salts thereof and combinations thereof.

In the context of the present invention, c1) is understood to mean polyphosphoric acid, meta-polyphosphoric acid and/or salts thereof, in particular sodium, potassium, ammonium, and acidic salts, for example sodium phosphate, potassium phosphate, ammonium phosphate, sodium dihydrogen phosphate, potassium dihydrogen phosphate, disodium hydrogen phosphate, dipotassium hydrogen phosphate, tetrasodium diphosphate, tetrapotassium diphosphate, tetraammonium diphosphate, sodium triphosphate, potassium triphosphate, ammonium triphosphate, sodium hexametaphosphate, potassium hexametaphosphate, ammonium hexametaphosphate, sodium polyphosphate, potassium hexapolyphosphate, ammonium polyphosphate, disodium dihydrogen diphosphate, trisodium hydrogen diphosphate, sodium trihydrogen diphosphate, dipotassium dihydrogen diphosphate, potassium trihydrogen diphosphate, tripotassium hydrogen diphosphate and combinations thereof.

In the context of the present invention, c2) is understood to mean organic phosphonic acids, particularly hydroxyethanediphosphonic acid, hydroxyphosphonoacetic acid, aminomethylenetriphosphonic acid, phosphonobutanetricarboxylic acid, hexamethylenediaminetetramethylenephosphonic acid, diethylenetriaminepentamethylenephosphonic acid, ethylenediaminetetramethylenephosphonic acid, hydroxyethylaminodimethylenephosphonic acid, bishexamethylenetriaminepentamethylenephosphonic acid, phosphonoligocarboxylic acid and salts thereof, combinations thereof.

In accordance with a preferred embodiment, the composition comprises the constituent b) and the weight ratio of the constituent a) to the constituent b), calculated in each case as pure substance, is in the range of 1:20 to 20:1, preferably in the range of 1:10 to 10:1.

In accordance with a preferred embodiment, the constituent b) is selected from the constituents b1) and b2), and in particular tartaric acid, malic acid, lactic acid, glycolic acid, gluconic acid, citric acid, isocitric acid, mandelic acid, mevalonic acid, tartronic acid, hydroxyalkanoic acid, gallic acid, salicylic acid, hydroxybenzoic acid, aspartic acid, alkanedioic acids, unsaturated alkanedioic acids, in particular fumaric acid, maleic acid, butanetetracarboxylic acid, cyclohexanehexanecarboxylic acid, salts thereof, mixtures thereof.

In accordance with a preferred embodiment, the use according to the invention comprises alkanedioic acids selected from alkanedioic acids having the formula $COOH-(CH_2)_n-COOH$, wherein n is in the range from 1 to 14.

In accordance with a preferred embodiment, the use according to the invention comprises a constituent c), wherein the constituent c) is selected from polyphosphoric acid, meta-polyphosphoric acid and salts thereof, in particular sodium, potassium, ammonium salts and/or acidic salts thereof, organic phosphonic acids, particularly hydroxyethanediphosphonic acid, hydroxyphosphonoacetic acid, aminomethylenetriphosphonic acid, phosphonobutanetricarboxylic acid, hexamethylenediaminetetramethylenephosphonic acid, diethylenetriaminepentamethylenephosphonic acid, ethylenediaminetetramethylenephosphonic acid, hydroxyethylaminodimethylenephosphonic acid, bishexamethylenetriaminepentamethylenephosphonic acid, phosphonoligocarboxylic acid and salts thereof, mixtures thereof.

In accordance with a preferred embodiment, the use according to the invention comprises polyphosphoric acid selected from polyphosphoric acids having the formula $H_{n+2}P_nO_{3n+1}$, wherein n is in the range from 1 to 100, preferably in the range from 1 to 10.

In accordance with a preferred embodiment, the use according to the invention comprises meta-polyphosphoric acid selected from meta-polyphosphoric acids having the formula $H_nP_nO_{3n}$, wherein n is in the range from 3 to 100, preferably in the range from 3 to 10.

In accordance with a preferred embodiment, the composition is an aqueous solution or dispersion.

In accordance with a preferred embodiment, phosphotartaric acid is used in combination with biodispersants.

In the context of the present invention, biodispersant is understood to mean a surface-active substance having a cleaning effect on organically contaminated surfaces, for example, surfaces contaminated by a growth of biofilm. The biodispersant itself is generally not a biocide but may be used together with biocides in an advantageous manner. Examples of biodispersants are polyalkylene glycols, terpenes, non-ionic surfactants, anionic surfactants, cationic surfactants, amphoteric surfactants and mixtures thereof.

In accordance with a preferred embodiment, phosphotartaric acid is used in combination with biocides. In the context of the present invention, biocides are understood to mean active ingredients, preparations and compositions which are intended by chemical or biological means to destroy, deter or render harmless harmful organisms, to prevent damage caused by them or to combat them in other ways. In air-conditioning technology, for example, biocides against microorganisms are added to the water circuit, so that contamination of a re-cooling plant is prevented. Examples of biocides are oxidizing biocides, for example chlorine, hypochlorites, hypobromites, bromochloride, chlorine dioxide, ozone, hydrogen peroxide, perborates, permanganates, organic peracids, di- and trichloroisocyanurates, non-oxidizing biocides, for example glutardialdehyde, quaternary ammonium or phosphonium compounds, polyquaternary ammonium compounds, isothiazole compounds, copper or silver compounds, bronopol, benzoates, thiocarbamates, azines, 2,2-dibromo-2-cyanoacetamides, halohydantoins and haloamines and mixtures thereof.

In accordance with a preferred embodiment, the use also comprises the combination of phosphotartaric acid with one or more bio dispersant(s) and/or with one or more biocide(s) and/or further constituents selected from corrosion inhibitors, scale inhibitors, dispersants.

DESCRIPTION OF FIGURES AND EXAMPLES

The invention is illustrated in detail below by FIGS. 1 and 2 and Examples 1 to 5.

Figure 1:
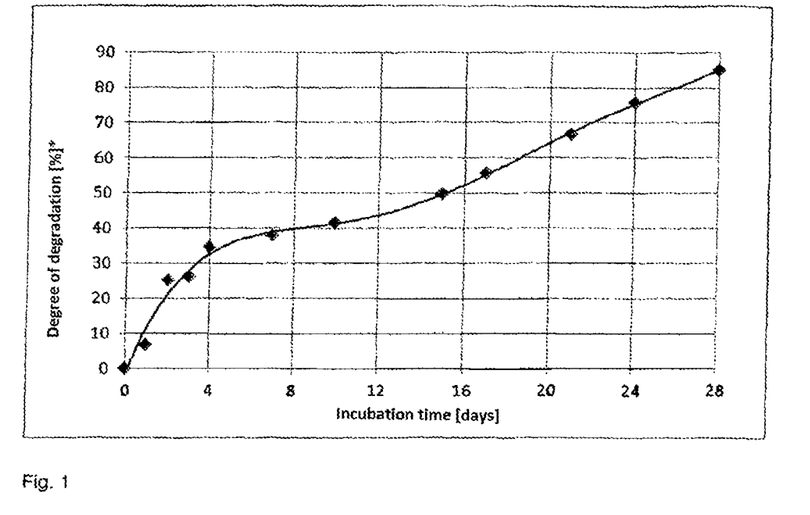
FIG. 1 shows, by way of example, the course of the biological degradation of phosphotartaric acid (PTA) over a time period of 28 days according to test method OECD 302b.

FIG. 1 shows the course of the biological degradation of phosphotartaric acid (PTA) over a time period of 28 days according to the test method OECD 302b. The incubation time in days is shown on the x-axis and the degree of degradation in % on the y-axis. The OECD guideline 302b describes the modified Zahl-Wellens test. In this case, the sample is exposed to a microbiologically active inoculum over a time period of 28 days in the presence of mineral nutrients, air and heat. The degree of degradation is determined by measurement of the dissolved organic carbon content DOC and comparison with a sample-free control solution treated in the same manner. The activity of the inoculum is checked by means of a reference measurement using a standard (diethylene glycol). Erroneous measurement results due to so-called spontaneous elimination, which is caused by the adsorption (and the associated withdrawal of the sample from the system), is ruled out in this case by observing an equilibration period (ca. 210 min) before starting the DOC measurements. The biological degradability was investigated at two different concentrations, in each case as a duplicate. In FIG. 1, the mean of the 4 parallel installed degradation tests (2×200 mg/L, 2×350 mg/L) were plotted against the degradation time. The degree of degradation was calculated by means of the DOC value determined from Formula 1. The degree of degradation of the diethylene glycol reference exceeded 90% after 4 days which indicates sufficient activity of the inoculum. The degree of degradation was determined by measurement of the fraction of dissolved organic carbon (DOC in mg/L) and calculated according to Formula 1 below.

$$\text{Degree of degradation in percent} = \left[1 - \frac{DOC^t_{Sample} - DOC^t_{Reference}}{DOC^0_{Sample} - DOC^0_{Reference}}\right] \times 100\% \quad \text{Formula 1}$$

$DOC^t_{sample}$=dissolved organic carbon in the sample over the test period t,
$DOC^t_{reference}$=dissolved organic carbon in the reference substance over the test period t,
$DOC^0_{sample}$=dissolved organic carbon in the sample at the start of the test,
$DOC^0_{reference}$=dissolved organic carbon in the reference substance at the start of the test, If a degree of degradation of the test substance of ca. 70% is reached after 10 days, this is rated as readily biologically degradable. The phosphotartaric acid tetrapotassium salt investigated in this example reached a degree of degradation of 70% only after a test period of 20-24 days. Therefore, the phosphotartaric acid tetrapotassium salt can be classified as inherently biologically degradable and thus represents an attractive compromise between user-friendly robustness and environmental computability.

Figure 2:
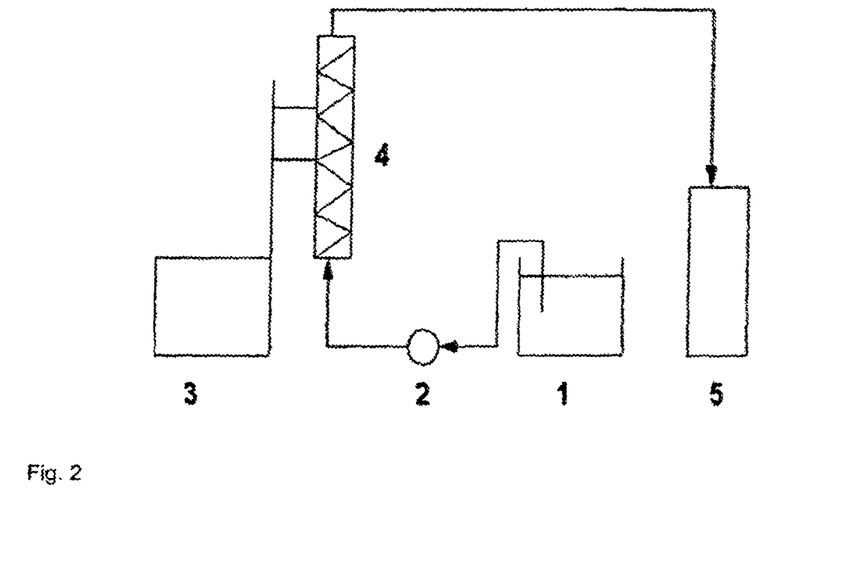
FIG. 2 shows, by way of example, a schematic experimental setup for determining the effect of a substance as a calcium carbonate scale inhibitor.

In FIG. 2, the experimental setup for the determination of the effect of a substance as a calcium carbonate scale inhibitor is presented. 2 liters of the test water (composition see Table 7) are charged in a glass beaker 1 and the PTA concentration to be tested is added and the solution is pumped by means of a peristaltic pump 2 through a glass reflux condenser (heat exchanger 4) at a flow rate of 0.5 L/h over a time period of two hours and is collected in a measuring cylinder 5. The glass reflux condenser is heated with water, which is maintained at a temperature of 80° C. by means of a thermostat 3.

For the following examples, the preparation of phosphotartaric acid is described in the prior art, for example in 142. Feodor Lynen and Hans Bayer: Phospho-d(+)-tartaric acid, from the University Chemistry Laboratory Munich, Biochemistry Department and the laboratory of Gebr. Bayer, Augsburg, received Apr. 2, 1952, No. 9-10/1952, Chemische Berichte Volume 1985, pp. 905-912; C. Neuberg and W. Schuchardt: Über die Synthese der Phospho-d-weinsäure and ihre phosphatatische Spaltung (On the synthesis of phospho-d-tartaric acid and the phosphatatic cleavage thereof), from the Kaiser Wilhelm Institute for Biochemistry in Berlin-Dahlem, 28.111.36, pp. 39-47.

In the following examples, phosphotartaric acid was prepared according to the method specification of Lynen and Bayer. The reaction in pyridine was selected as method variant (F. Lynen, H. Bayer; Chemische Berichte 1952, 85, 905-912). The dibrucin salt of phosphotartaric acid obtained was converted into the free acid according to the workup p. 910 of the abovementioned method specification via the ammonium salt and then deviating from this specification via treatment with a strongly acidic cation exchange resin (Amberjet® 1200 hydrogen form). The pure phosphotartaric acid thus obtained was converted to the tetrapotassium salt with aqueous potassium hydroxide solution and, based on the tetrapotassium salt, a 60% aqueous solution was prepared.

Example 1

Corrosion Inhibition of Steel 1 liter of the test water (composition see Table 1) was charged in a glass beaker, the phosphotartaric acid (PTA) concentration (60% solution of the tetrapotassium salt) to be tested was added and the test water was heated to 30° C. in a water bath. Three steel coupons (C 1010) are fixed to a holder and rotated vertically by means of a stirring motor in the test water at 100 revolutions/minute for a period of 24 hours. In this manner, the coupons are completely immersed in the test water.

TABLE 1

Composition of the test water

| Parameter | Unit | Value |
|---|---|---|
| Calcium | Mol/m$^3$ | 1.2 |
| Magnesium | Mol/m$^3$ | 0.3 |
| Hydrogen carbonate | Mol/m$^3$ | 1.9 |
| Sulfate | Mol/m$^3$ | 0.4 |
| Chloride | Mol/m$^3$ | 1.7 |
| Sodium | Mol/m$^3$ | 2.2 |
| Nitrates | Mol/m$^3$ | 0.8 |
| pH | | 8.2 |

The coupons are freed from adhering iron oxide/hydroxide in the test water by means of a brush and removed from the test water. The test water is homogenized by vigorous stirring, 50 ml are removed while stirring and transferred to a volumetric flask. The undissolved iron salts are dissolved by addition of concentrated hydrochloric acid and, after filling the volumetric flask with deionized water, the iron concentration of the solution is measured by atomic absorption spectroscopy in accordance with DIN 38 406-E7-1 with the following deviations from standard:

2.1 The application range is from 0.1 to 5.0 mg/L.
2.2 It is processed using an air-acetylene flame. The extinction is measured at a wavelength of 324.8 nm.
2.6 The nitric acid/cesium solution consists of: 500 ml of nitric acid, 500 ml of Suprapur deionized water and 100 g of cesium chloride p.a., copper stock solution, β(Cu)=1000 mg/L, copper reference solution; β(Cu)=5 mg/L the reference solution includes 1 ml of the nitric acid/cesium solution in 100 ml.
the blank solution/zero value solution demineralized water without nitric acid.
2.7 The samples to be investigated are stored in plastic containers. The samples to be investigated are acidified directly after sampling with the nitric acid/cesium solution. 0.1 ml of acid solution is added to 10 ml of sample.

The relative corrosion inhibition for steel ($RCI_{Fe}$ [%]) is derived from the measured iron concentration $C_{Fe,c}$ and the measured iron concentration without addition of inhibitor (blank value) $C_{Fe,0}$ according to formula 2 below:

$$RCI_{Fe}=(1-C_{Fe,c}/C_{Fe,0})\times 100\%.$$  Formula 2:

In Table 2, the measured iron concentrations and the relative corrosion inhibition for steel are shown as a function of the concentration of PTA. At a concentration of 20 mg/L, the corrosion of steel is reduced to about 89%.

TABLE 2 measured iron concentrations and the relative corrosion inhibition of steel as a function of the concentration of PTA.

| Concentration PTA [mg/L] | Iron concentration $C_{Fe,c}$ [mg/L] | $RCI_{Fe}$ [%] |
|---|---|---|
| 0 (blank) | 36 | 0 |
| 10 | 32 | 11 |
| 20 | 28 | 22 |
| 30 | 3.0 | 92 |
| 40 | 3.1 | 91 |

Example 2

Corrosion Inhibition of Steel

Mixtures of phosphotartaric acid (PTA) (60% solution of the tetrapotassium salt) and another corrosion inhibitor were tested according to the test specification of Example 1. The sum of the individual inhibitor concentrations was always 20 mg/L, wherein the proportions of the inhibitors were varied.

The relative synergy effect RS(M) of a mixture is derived from the measured relative corrosion inhibition $RCI(M)_{Fe,meas}$ and the calculated relative corrosion inhibition $RCI(M)_{Fe,calc}$ in accordance with formula 3 below:

$$RS(M)=RCI(M)_{Fe,meas}/RCI(M)_{Fe,calc}-1.$$  Formula 3:

If RS is >0 a synergistic effect is present, if RS<0 an antagonistic effect.

The calculated relative corrosion inhibition $RCI(M)_{Fe,calc}$ is derived from the weighted mean of the measured relative corrosion inhibition $RCI(A)_{Fe,meas}$ and $RCI(B)_{Fe,meas}$ of the two individual components A and B alone, in accordance with formula 4 below:

$$RCI(M)_{Fe,calc}=c(A)/20\cdot RCI(A)_{Fe,meas}+c(B)/20 RCI(B)_{Fe,meas}$$  Formula 4:

Here, c(A) and c(B) represent the concentrations of the components A and B in the mixture. In Table 3, the results for corrosion inhibition are shown for mixtures of phosphotartaric acid (PTA) (60% solution of the tetrapotassium salt)

and phosphonobutanetricarboxylic acid (50% acid in water) (PBTC). A synergistic effect is apparent for the mixture of phosphotartaric acid and phosphonobutanetricarboxylic acid in a ratio of 6:1 to 1:6.

TABLE 3

Results for corrosion inhibition for mixtures of phosphotartaric acid (PTA) and phosphonobutanetricarboxylic acid (PBTC).

| Concentration PTA [mg/L] | Concentration PBTC [mg/L] | Ratio PTA/PBTC | Iron concentration $C_{Fe,c}$ [mg/L] | $RCI_{Fe,meas}$ [%] | $RCI_{Fe,calc}$ [%] | RS ((M) |
|---|---|---|---|---|---|---|
| 20 | 0 |  | 28 | 22 | 22 | 0.0 |
| 17 | 3 | 5.7:1 | 23 | 36 | 21 | 0.8 |
| 13 | 7 | 1.9:1 | 15 | 58 | 18 | 2.2 |
| 10 | 10 | 1:1 | 19 | 47 | 17 | 1.8 |
| 7 | 13 | 1:1.9 | 25 | 31 | 15 | 1.0 |
| 3 | 17 | 1:5.7 | 25 | 31 | 13 | 1.4 |
| 0 | 20 |  | 32 | 11 | 11 | 0.0 |

In Table 4, the results for corrosion inhibition are shown for mixtures of phosphotartaric acid (PTA) (60% solution of the tetrapotassium salt) and tartaric acid (TA). A synergistic effect is apparent for the mixture of phosphotartaric acid and tartaric acid in a ratio of 6:1 to 1:6.

TABLE 4

Results for corrosion inhibition for mixtures of phosphotartaric acid (PTA) and tartaric acid (TA).

| Concentration PTA [mg/L] | Concentration TA [mg/L] | Ratio PTA/TA | Iron Concentration $C_{Fe,c}$ [mg/L] | $RCI_{Fe,meas}$ [%] | $RCI_{Fe,calc}$ [%] | RS (M) |
|---|---|---|---|---|---|---|
| 20 | 0 |  | 28 | 22 | 22 | 0.0 |
| 17 | 3 | 5.7:1 | 12 | 68 | 32 | 1.1 |
| 13 | 7 | 1.9:1 | 3.2 | 91 | 46 | 1.0 |
| 10 | 10 | 1:1 | 3.3 | 91 | 56 | 0.6 |
| 7 | 13 | 1:1.9 | 3.0 | 92 | 66 | 0.4 |
| 3 | 17 | 1:5.7 | 3.3 | 91 | 79 | 0.2 |
| 0 | 20 |  | 4.0 | 89 | 89 | 0.0 |

In Table 5, the results for corrosion inhibition are shown for mixtures of phosphotartaric acid (PTA) (60% solution of the tetrapotassium salt) and citric acid (60% in water) (CA). A synergistic effect is apparent for the mixture of phosphotartaric acid and citric acid in a ratio of 6:1 to 1:6.

TABLE 5

Results for corrosion inhibition for mixtures of phosphotartaric acid (PTA) and citric acid (CA).

| Concentration PTA [mg/L] | Concentration CA [mg/L] | Ratio PTA/CA | Iron Concentration $C_{Fe,c}$ [mg/L] | $RCI_{Fe,meas}$ [%] | $RCI_{Fe,calc}$ [%] | RS(M) |
|---|---|---|---|---|---|---|
| 20 | 0 |  | 28 | 22 | 22 | 0.0 |
| 17 | 3 | 5.7:1 | 20 | 43 | 26 | 0.7 |
| 13 | 7 | 1.9:1 | 7.8 | 78 | 31 | 1.5 |
| 10 | 10 | 1:1 | 13 | 64 | 35 | 0.8 |
| 7 | 13 | 1:1.9 | 15 | 58 | 39 | 0.5 |
| 3 | 17 | 1:5.7 | 13 | 65 | 44 | 0.5 |
| 0 | 20 |  | 19 | 48 | 48 | 0.0 |

Example 2a

A mixture (MI) of 45% phosphotartaric acid (PTA) (60% solution of the tetrapotassium salt), 12% tartaric acid and 8% phosphoric acid in water was adjusted to a pH of 12.2 with aqueous potassium hydroxide solution and tested in accordance with the test specification of example 1.

In Table 5a the results for corrosion inhibition are shown for the mixture. A relative corrosion inhibition of over 90% is already achieved at a concentration of 30 mg/L.

TABLE 5a

Results for corrosion inhibition for a mixture of phosphotartaric acid (PTA), tartaric acid and phosphoric acid.

| Concentration MI [mg/L] | Iron concentration $C_{Fe,\,c}$ [mg/L] | $RCI_{Fe}$ [%] |
|---|---|---|
| 0 (Blank) | 36 | 0 |
| 10 | 20 | 44 |
| 20 | 17 | 54 |
| 30 | 3.0 | 92 |
| 40 | 2.6 | 93 |

Example 3

Corrosion Inhibition of Brass

The tests were carried out according to the method described in example 1 using brass coupons (CDA 443) and, after completion of the test, the concentrations of copper and zinc in the test water were determined by atomic absorption spectroscopy.

The relative corrosion inhibition for brass ($RCI_{Cu}$ [%]) according to formula 5 and ($RCI_{Zn}$ [%]) according to formula 6 is derived from the measured copper and zinc concentrations $C_{Cu,c}$ and $C_{Zn,c}$ respectively and the measured copper and zinc concentrations without addition of inhibitor (blank value) $C_{Cu,0}$ and $C_{Zn,0}$ respectively:

$$RCI_{Cu} = (1 - C_{Cu,c}/C_{Cu,0}) \times 100\%$$  Formula 5:

$$RCI_{Zn} = (1 - C_{Zn,c}/C_{Zn,0}) \times 100\%$$  Formula 6:

In Table 6, the measured copper and zinc concentrations and the relative corrosion inhibition for copper and zinc are shown as a function of the concentration of PTA. At a concentration of 20 mg/L, the corrosion of copper and zinc is reduced to about 75% and 87% respectively.

TABLE 6

Measured copper and zinc concentrations and the relative corrosion inhibition for copper and zinc as a function of the concentration of PTA.

| Concentration PTA [mg/L] | Copper concentration $C_{Cu,\,c}$ [mg/L] | $RCI_{Cu}$ [%] | Zinc concentration $C_{Zn,\,c}$ [mg/L] | $RCI_{Zn}$ [%] |
|---|---|---|---|---|
| 0 (Blank) | 0.77 | 0 | 0.78 | 0 |
| 20 | 0.19 | 75 | 0.10 | 87 |
| 60 | 0.16 | 79 | 0.05 | 94 |

Example 4

Inhibition of Calcium Carbonate Deposits

Example 4 was carried out to determine the effect of a substance as calcium carbonate scale inhibitor according to an experimental setup according to FIG. 2.

TABLE 7

Composition of the test water

| Parameter | Unit | Value |
|---|---|---|
| Calcium | Mol/m$^3$ | 5.4 |
| Magnesium | Mol/m$^3$ | 1.8 |
| Hydrogen carbonate | Mol/m$^3$ | 20 |
| Sulfate | Mol/m$^3$ | 1.8 |
| Chloride | Mol/m$^3$ | 10.8 |
| Sodium | Mol/m$^3$ | 20 |
| pH | | 8.5 |

After a test period of 2 hours, the water remaining in the glass reflux condenser is carefully removed using the peristaltic pump. The calcium carbonate isolated on the glass wall is dissolved with hydrochloric acid. The hydrochloric acid collected in a beaker is made up to a defined volume (100 ml) with demineralized water and, after neutralization, the calcium concentration is determined by complexometric titration (0.01783 mol/L sodium EDTA solution, manufacturer Bernd Kraft GmbH, Item No.: 01083.3000). The titration endpoint is indicated by the color change of the calconcarboxylic acid indicator from red-violet to blue.

The relative calcium carbonate inhibition (RCI [%]) is derived according to formula 7 from the consumption of the titration solution $V_c$ and the consumption of the titration solution without addition of inhibitor (blank) $V_0$:

$$RCI = (1 - V_c/V_0) \times 100\% \quad \text{Formula 7:}$$

In Table 8, the consumptions of the titration solution and the relative calcium carbonate inhibition are shown as a function of the concentration of PTA (60% solution of the tetrapotassium salt). At a concentration of 4 mg/L, the calcium carbonate deposition is virtually completely prevented, and from 6 mg/L completely prevented.

TABLE 8

Consumptions of the titration solution and the relative calcium carbonate inhibition as a function of the concentration of PTA.

| Concentration PTA [mg/L] | Consumption $V_c$ [ml] | RCI [%] |
|---|---|---|
| 0 (Blank) | 11.8 | 0 |
| 2 | 6.2 | 48 |
| 4 | 0.7 | 94 |
| 6 | 0 | 100 |
| 8 | 0 | 100 |
| 10 | 0 | 100 |

Example 5

Determination of the Chlorine Stability of PTA

The chlorine stability of PTA was determined analogously to commercial phosphonic acids by the partial conversion of the organically bound phosphate (org-PO$_4$) to orthophosphate. The total phosphate (tot-PO$_4$) and orthophosphate (o-PO$_4$) content in the test solutions was determined in this case. The organically bound phosphate is derived from org-PO$_4$=tot-PO$_4$–o-PO$_4$.

The tot-PO$_4$ and o-PO$_4$ were determined using the Laborautomat Ganimede P from Dr. Lange. The Ganimede analysis unit P enables the measurement of PO$_4$ as total phosphate or orthophosphate by means of a photometric method according to DIN EN 1189 from 12/96.

The total phosphate is determined after high-temperature digestion of organic phosphate to give orthophosphate. In this case, ca. 2 mL of sample are heated with a digestion reagent for 90 seconds at 150° C. and 6 bar. Two safety levels release a potential resulting overpressure at 7 and 9 bar. The sample is subsequently cooled to 90° C. by cooling in air. The digested solution is automatically pumped from the digestion cuvette into the analysis cuvette and the required reagents (color and reducing reagent) are added. The sample is further cooled to ca. 45° C. By heating the sample, the reaction time for the formation of the phosphorus molybdenum blue is shortened; the total phosphate content is then determined photometrically at 880 nm.

To determine the orthophosphate content, the sample is pumped directly into the analysis cuvette without digestion, mixed with the reagents and measured photometrically at 880 nm.

2 L of Düsseldorf drinking water are placed in a glass beaker. A hypochlorite content of 1 mg/L (given as Cl$_2$) is set using the NaOCl solution (0.013%). The pH is subsequently adjusted to 8.5 and 1 mg Br/L as sodium bromide is added to the raw material to be tested. The free chlorine content and the pH are checked every 15 minutes and adjusted as required.

The duration of the test is 4 hours in total. Immediately after the test start and then half hourly a 50 ml sample is removed to determine the t-PO$_4$ and o-PO$_4$ content. The hypochlorite in the samples taken is decomposed with 1-2 mL of urea solution (4%). The tests were carried out at room temperature.

The chlorine stability (Cl$_2$St(t)) is derived from the percentage org-PO$_4$ content at the experimental timepoint (org-PO$_4$(t)) relative to the org-PO$_4$ content at the start of the experiment (org-PO$_4$(0)), according to: Cl$_2$St(t)=(1−(org-PO$_4$(0)−org-PO$_4$(t))/org-PO$_4$(0))*100%. The chlorine stability was determined on a 60% solution of the tetrapotassium salt of PTA. For comparison, the data for commercial phosphonic acids have been determined. This shows that PTA has a significantly higher chlorine stability than 3 of the 4 phosphonic acids investigated.

TABLE 9

Chloride stabilities of PTA compared to commercial phosphonic acids as a function of time - all data in % unless otherwise stated.

| Test duration [h] | PTA, 20 mg/L | PBTC, 20 mg/L | ATMP, 10 mg/L | HEDP, 10 mg/L | HPA, 10 mg/L |
|---|---|---|---|---|---|
| org-PO4 (0) | 2.6 mg/L | 3.5 mg/L | 4.6 mg/L | 5.5 mg/L | 5.5 mg/L |
| 0.05 | 91 | 95 | 87 | 85 | 70 |
| 0.5 | 90 | 93 | 74 | 67 | 39 |
| 1 | 81 | 94 | 68 | 71 | 27 |
| 1.5 | 80 | 93 | 62 | 50 | 19 |
| 2 | 80 | 90 | 60 | 38 | 14 |
| 2.5 | 80 | 93 | 52 | 29 | 9 |
| 3 | 81 | 93 | 53 | 21 | 6 |
| 3.5 | not determined | 97 | 52 | 14 | 3 |
| 4 | 78 | 92 | 52 | 6 | 1 |

PBTC=phosphonobutanetricarboxylic acid 50%
ATMP=aminotrimethylenephosphonic acid 50%

HEDP=hydroxyethanediphosphonic acid 60%
HPA=hydroxyphosphonoacetic acid 50%

The invention claimed is:

1. A method of treating water, comprising:
    adding at least one of phosphotartaric acid and salts thereof in water in a water-conducting system.
2. The method as claimed in claim 1, wherein the phosphotartaric acid is added to the water-conducting system in an amount of 0.1 to 10000 mg based on one liter of the water in the water-conducting system.
3. The method as claimed in claim 1, wherein the water in the water-conducting system has a conductivity in a range of 1 to 200000 µS/cm.
4. The method as claimed in claim 1, wherein the at least one of the phosphotartaric acid and the salts thereof is added in the water-conducting system having a calcium hardness in a range of 0 to 30 mol based on one cubic meter of liquid of the water-conducting system.
5. The method as claimed in claim 1, wherein the at least one of the phosphotartaric acid and the salts thereof is in a form of one or more alkali metal salts and/or one or more ammonium salts.
6. The method as claimed in claim 1, wherein the at least one of the phosphotartaric acid and the salts thereof is a corrosion inhibitor.
7. The method as claimed in claim 1, wherein the at least one of the phosphotartaric acid and the salts thereof is a scale inhibitor.
8. The method as claimed in claim 1, wherein the at least one of the phosphotartaric acid and the salts thereof is constituent a) and added together with at least one of constituent b) and constituent c),
    wherein the constituent b) is at least one selected from the group consisting of aliphatic di-, tri- and oligocarboxylic acids comprising up to 6 carboxylic acid groups, aliphatic monocarboxylic acids having at least one hydroxyl group, amino acids, and salts thereof, and
    the constituent c) is at least one selected from the group consisting of inorganic polyphosphoric acid, meta-polyphosphoric acid and salts thereof, and water-soluble organic phosphonic acids and salts thereof.
9. The method as claimed in claim 8, wherein the constituent a) is added with the constituent b), and
    a weight ratio of the constituent a) to the constituent b), calculated in each case as pure substance, is in a range of 1:20 to 20:1.
10. The method as claimed in claim 8, wherein the constituent b) is at least one selected from the group consisting of tartaric acid, malic acid, lactic acid, glycolic acid, gluconic acid, citric acid, isocitric acid, mandelic acid, mevalonic acid, tartronic acid, hydroxyalkanoic acid, gallic acid, salicylic acid, hydroxybenzoic acid, aspartic acid, alkanedioic acids, unsaturated alkanedioic acids, and salts thereof.
11. The method as claimed in claim 10, wherein the alkanedioic acids have a formula COOH—$(CH_2)_n$—COOH, wherein n is in a range from 1 to 14.
12. The method as claimed in claim 8, wherein the constituent a) is added with the constituent c), and
    the constituent c) is at least one selected from the group consisting of polyphosphoric acid, metapolyphosphoric acid and salts thereof, and organic phosphonic acids.
13. The method as claimed in claim 12, wherein the polyphosphoric acid has a formula $H_{n+2}P_nO_{3n+1}$, wherein n is in a range from 1 to 100.
14. The method as claimed in claim 12, wherein the meta-polyphosphoric acid has a formula $H_nP_nO_{3n}$, wherein n is in a range from 3 to 100.
15. The method as claimed in claim 8, wherein the at least one of the phosphotartaric acid and the salts thereof is in a form of an aqueous solution or dispersion.
16. The method as claimed in claim 8, wherein the constituent b) is at least one selected from the group consisting of fumaric acid, maleic acid, butanetetracarboxylic acid, cyclohexanehexanecarboxylic acid, and salts thereof.
17. The method as claimed in claim 1, wherein the phosphotartaric acid is added with at least one biodispersant selected from the group consisting of polyalkylene glycols, terpenes, non-ionic surfactants, anionic surfactants, cationic surfactants, and amphoteric surfactants.
18. The method as claimed in claim 1, wherein the phosphotartaric acid is added with at least one biocide selected from the group consisting of chlorine, hypochlorites, hypobromites, bromochloride, chlorine dioxide, ozone, hydrogen peroxide, perborates, permanganates, organic peracids, di- and trichloroisocyanurates, glutardialdehyde, quaternary ammonium or phosphonium compounds, polyquaternary ammonium compounds, isothiazole compounds, copper or silver compounds, bronopol, benzoates, thiocarbamates, azines, 2,2-dibromo-2-cyanoacetamides, halohydantoins, and haloamines.
19. The method as claimed in claim 1, wherein the phosphotartaric acid is added with at least one selected from the group consisting of
    (A) at least one biodispersant selected from the group consisting of polyalkylene glycols, terpenes, non-ionic surfactants, anionic surfactants, cationic surfactants, and amphoteric surfactants,
    (B) at least one biocide selected from the group consisting of chlorine, hypochlorites, hypobromites, bromochloride, chlorine dioxide, ozone, hydrogen peroxide, perborates, permanganates, organic peracids, di- and trichloroisocyanurates, glutardialdehyde, quaternary ammonium or phosphonium compounds, polyquaternary ammonium compounds, isothiazole compounds, copper or silver compounds, bronopol, benzoates, thiocarbamates, azines, 2,2-dibromo-2-cyanoacetamides, halohydantoins, and haloamines, and
    (C) at least one selected from the group consisting of a corrosion inhibitor, a scale inhibitor, and a dispersant.
20. A composition comprising phosphotartaric acid and/or salts thereof and one or more hydroxycarboxylic acid(s) and/or salts thereof.

* * * * *